(12) United States Patent
Sheridan et al.

(10) Patent No.: US 11,519,338 B1
(45) Date of Patent: Dec. 6, 2022

(54) GEAR TRAIN WITH VARIABLE INPUT DIRECTION OF ROTATION AND CONSTANT OUTPUT DIRECTION OF ROTATION

(71) Applicant: Raytheon Technologies Corporation, Farmington, CT (US)

(72) Inventors: William C. Sheridan, Moodus, CT (US); William G. Sheridan, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/578,818

(22) Filed: Jan. 19, 2022

(51) Int. Cl.
*F02C 7/32* (2006.01)
*F02C 7/36* (2006.01)
*F02K 3/04* (2006.01)
*F16H 1/20* (2006.01)
*F16D 41/069* (2006.01)

(52) U.S. Cl.
CPC .............. *F02C 7/32* (2013.01); *F02C 7/36* (2013.01); *F02K 3/04* (2013.01); *F16D 41/069* (2013.01); *F16H 1/20* (2013.01); *F05D 2260/403* (2013.01); *F05D 2260/98* (2013.01)

(58) Field of Classification Search
CPC ...... F02C 7/32; F02C 7/36; F02K 3/04; F16D 41/069; F16H 1/20
See application file for complete search history.

(56) References Cited

U.S. PATENT DOCUMENTS

| | | | |
|---|---|---|---|
| 10,167,873 B2 * | 1/2019 | Sheridan | F02C 7/32 |
| 10,443,697 B2 * | 10/2019 | Feraud | F16F 15/16 |
| 10,458,330 B2 | 10/2019 | Sheridan | |
| 10,731,748 B2 * | 8/2020 | Mathieu | F02C 7/36 |
| 10,787,930 B2 * | 9/2020 | Sheridan | F02C 7/36 |
| 2017/0122330 A1 * | 5/2017 | Mastro | F04D 29/325 |
| 2019/0353105 A1 * | 11/2019 | Sheridan | F02C 7/36 |
| 2019/0376416 A1 * | 12/2019 | Mastro | F01D 15/08 |

\* cited by examiner

*Primary Examiner* — Derek D Knight
(74) *Attorney, Agent, or Firm* — Carlson, Gaskey & Olds, P.C.

(57) ABSTRACT

An oil system for a gas turbine engine includes an oil pump driven by a gear train having a main input drive gear rotating when a propulsor rotor rotates. The gear train includes two sets of gears joined by two connection shafts each having a clutch. The first set of the gears include a forward input gear and a reverse input gear each driven by the main input drive gear. The forward and the reverse input gears drive a pinion gear in the second set of gears through a clutch. Each clutch transmits rotation driven in a same driving direction and slips in an alternate driving direction. The first set of the gears has an even number of the gears, and the second set of the gears has an odd number of the gears.

20 Claims, 5 Drawing Sheets

GEAR TRAIN WITH VARIABLE INPUT DIRECTION OF ROTATION AND CONSTANT OUTPUT DIRECTION OF ROTATION

BACKGROUND

This application relates to the provision of a gear train for driving an oil pump to supply oil to a gear reduction in a gas turbine engine, wherein windmill rotation in either direction will cause the gear train to supply oil to the gear reduction.

Gas turbine engines are known and typically include a fan rotor delivering air into a bypass duct as bypass air and into a core engine. Air in the core engine is delivered to a compressor where is it compressed and delivered into a combustor section. The compressed air is mixed with fuel and ignited and products of this combustion pass downstream over turbine rotors, driving them to rotate.

Historically, a turbine rotor was directly connected to drive the fan rotor. However, recently it has been proposed to include a gear reduction between the turbine and the fan rotor.

The gear reduction requires adequate lubrication under all operational conditions. One challenge is that a fan rotor on a gas turbine engine can experience so-called "wind milling" operation. Wind milling can occur if the engine is otherwise shutdown while in flight and air is driven across the fan blades by the movement of the associated aircraft. This can cause the fan rotor to rotate. In addition, a high wind while the associated aircraft is on the ground can also cause wind milling.

Lubricant must be supplied to the gear reduction during this wind milling operation, and a challenge is that the windmill rotation of the fan rotor can occur in either direction.

Gear trains are known that can lubricate an oil pump to supply oil when wind milling occurs. However, there are some remaining challenges.

SUMMARY

In a featured embodiment, a gas turbine engine includes a propulsor rotor. A gear reduction drives a propulsor shaft that drives the propulsor rotor. A turbine drives the gear reduction. An oil system includes an oil pump driven by a gear train having a main input drive gear rotating when the propulsor rotor rotates. The gear train includes two sets of gears. The two sets of the gears are joined by two connection shafts. The two connection shafts each have a clutch. A first of the set of gears include the main input drive gear. A second of the set of gears have an output drive gear to drive the oil pump. The first set of the gears include a forward input gear and a reverse input gear each driven by the main input drive gear. The forward input gear drives a forward pinion gear in the second set of gears through a first the clutch and the reverse input gear drives a reverse pinion gear in the second set of gears through a second the clutch. Each clutch transmits rotation driven in a same driving direction and slips in an alternate driving direction. The first set of the gears has an even number of the gears, and the second set of the gears has an odd number of the gears.

In another embodiment according to the previous embodiment, the main input drive gear is directly driven by the propulsor shaft and the forward and reverse pinion gears drive the oil pump though the output drive gear.

In another embodiment according to any of the previous embodiments, the output drive gear is a gear other than the forward and reverse pinion gears.

In another embodiment according to any of the previous embodiments, the main input drive gear is a gear other than the forward input gear and the reverse input gear.

In another embodiment according to any of the previous embodiments, the main input drive gear is a gear other than the forward input gear and the reverse input gear.

In another embodiment according to any of the previous embodiments, each clutch is one of a sprag, ramp-roller and spring clutch.

In another embodiment according to any of the previous embodiments, the main input drive gear is driven by one of a chain belt or hydraulic drive connected to the propulsor shaft.

In another embodiment according to any of the previous embodiments, the output drive gear is a gear other than the forward and reverse pinion gears.

In another embodiment according to any of the previous embodiments, the main input drive gear is a gear other than the forward input gear and the reverse input gear.

In another embodiment according to any of the previous embodiments, the main input drive gear is a gear other than the forward input gear and the reverse input gear.

In another embodiment according to any of the previous embodiments, each clutch is one of a sprag, ramp-roller and spring clutch.

In another embodiment according to any of the previous embodiments, the forward input gear and the reverse input gear each define an outer envelope at an outer periphery. There are an even number of gears having outer envelopes at an outer periphery intermediate the outer envelopes of the forward and reverse input gears.

In another embodiment according to any of the previous embodiments, the main input drive gear is a gear other than the forward input gear and the reverse input gear.

In another embodiment according to any of the previous embodiments, the output drive gear is a gear other than the forward and reverse pinion gears.

In another embodiment according to any of the previous embodiments, the main input drive gear is a gear other than the forward input gear and the reverse input gear.

In another embodiment according to any of the previous embodiments, the main input drive gear is a gear other than the forward input gear and the reverse input gear.

In another embodiment according to any of the previous embodiments, each clutch is one of a sprag, ramp-roller and spring clutch.

In another embodiment according to any of the previous embodiments, the gears in the first set of gears are co-planar.

In another embodiment according to any of the previous embodiments, the gears in the second set of gears are co-planar.

In another embodiment according to any of the previous embodiments, the gears in the second set of gears are co-planar.

The present disclosure may include any one or more of the individual features disclosed above and/or below alone or in any combination thereof.

These and other features can be best understood from the following specification and drawings.

DETAILED DESCRIPTION

Figure 1:
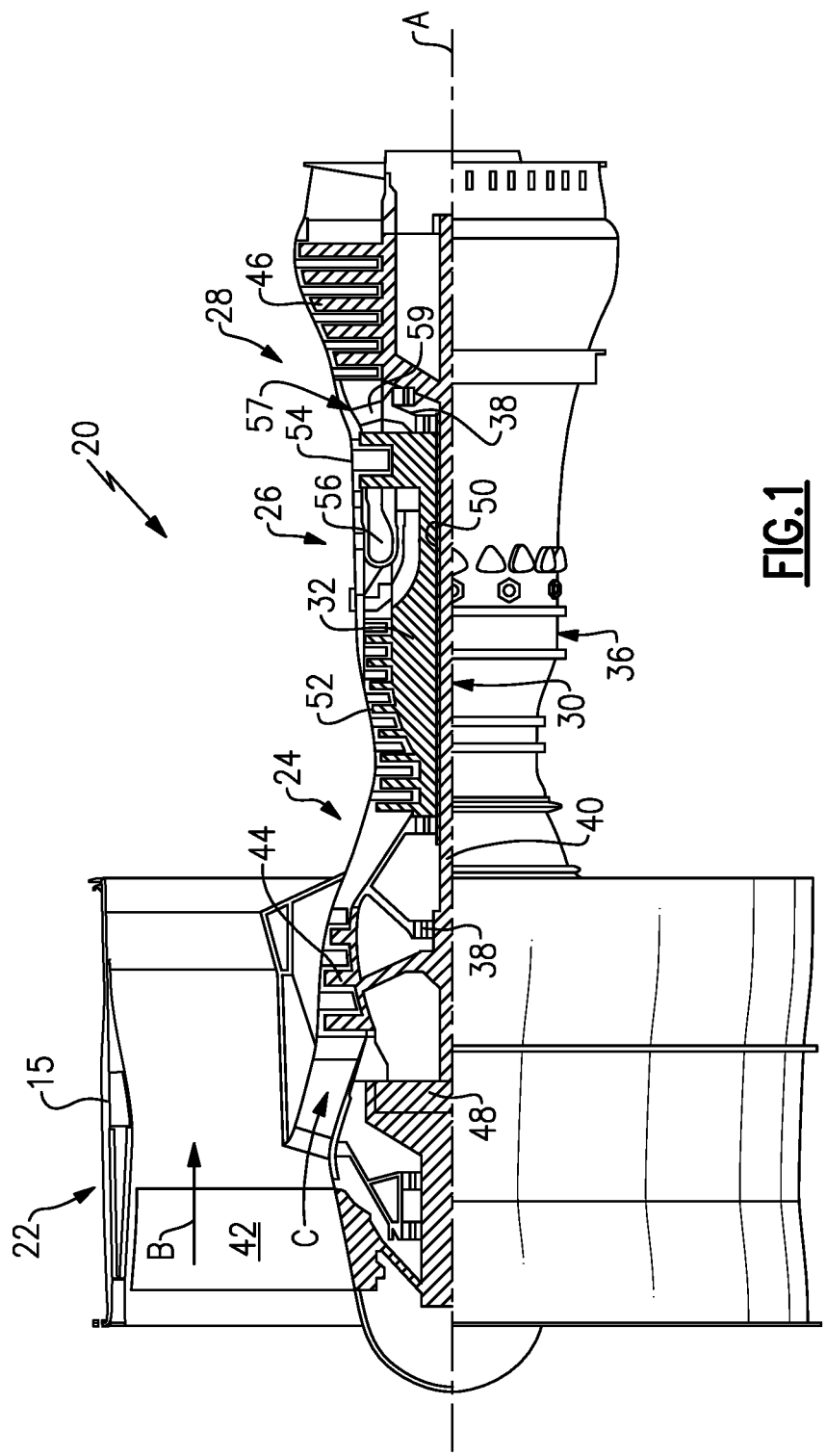
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to a fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low-pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
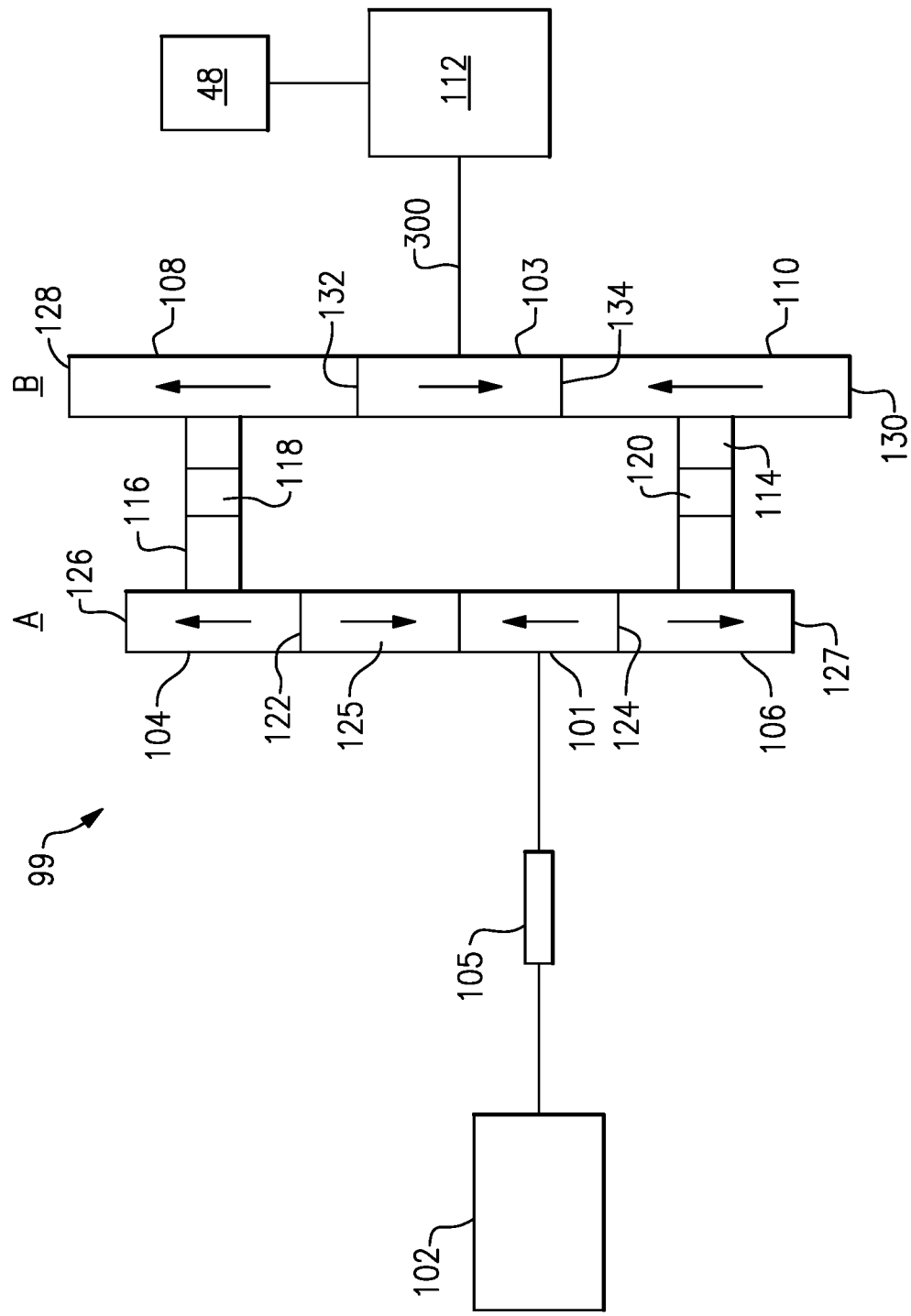
FIG. 2 shows a gear train undergoing fan rotation in a first train.

FIG. 2 shows a gear train 99 for driving an oil pump 112. It should be understood the oil pump could be a main lubricant pump for a main lubricant system, or could be an auxiliary pump for an auxiliary system.

Some details of the overall lubricant system such as in U.S. Pat. No. 10,458,330 may be utilized. As explained in that application, it is desirable for a lubricant system to provide lubricant to a gear reduction, such as gear reduction 48 in FIG. 1, under certain adverse conditions.

As one example, if there is a break or interruption in a main oil supply system, it would be desirable for the engine to be able to maintain operation for at least 30 seconds or longer at high power operation (such as takeoff) without damage to the gear reduction. This will provide time for a pilot to shut the engine down safely. Such an interruption could be caused by a break in an oil line, pump failure, or other failure in the main lubrication system.

After such an event, it is desirable to allow the engine to windmill in the air for 90 minutes or longer without damage to the gear reduction. It is also desirable to have the same protection if the engine is shut down for other reasons beyond oil system failure. As an example, a control system failure could shut the engine down and require it to windmill for extended periods of time.

It is also desirable to allow the engine to windmill indefinitely on the ground with wind speeds above 10 m.p.h. and below about 85 m.p.h. Ground wind milling refers to a condition where the engine is shut down. Wind may force the fan to rotate and turn causing components, such as components in the gear reduction to rotate. Such wind can turn the fan in a normal forward direction and also can turn the fan in a reverse direction should the wind flow from the back of the engine.

Finally, it is desirable to allow an aircraft to fly under negative gravity conditions for at least 20 seconds. During negative gravity conditions, the main oil system is interrupted similar to the first mentioned condition, but when positive gravity is returned, the main oil system may recover to full operation. To this end, the schematic pump of this disclosure may be arranged as a lubricant system as disclosed in U.S. Pat. No. 10,458,330, the disclosure of which is incorporated by reference.

The previously cited patent provides an overall main and auxiliary oil supply system which can meet all of these goals. The features of the application relating to achieving these goals are hereby incorporated by reference.

This application is related to a gear train for efficiently packaging a drive that can ensure the oil pump will supply oil when experiencing wind milling in either forward or reverse rotation.

FIG. 2, shows a propulsor rotor 102 driving a propulsor shaft 105. The propulsor shaft 105 drives a main input gear 101 while a fan is specifically disclosed, the propulsor could also be a propeller.

The gear train 99 transmits rotation from the main input drive gear 101 to the oil pump 112. The gear train 99 includes two sets of gears, A and B, with two interconnection shafts 114 and 116 through clutches 118 and 120. The main input drive gear 101 drives an A gear set and the output drive gear 103 is driven by the B list gear set. The A set of gear have an even number of gears and the B set of gears have an odd number of gears. This gear orientation has the two clutches 118 and 120 to transmit rotation. This orientation ensures that torque is transmitted to drive the oil pump 112 to the gear reduction 48.

The A set of gears includes the main input drive gear 101 and gears 125, 104 and 106. The B list of gears includes gears 103, 108 and 110. When the fan rotor 102 is driven to rotate, it rotates main input gear 101. In FIG. 2, the drive is in a first, or forward direction. Engaged gears 125 and 106 will rotate in the reverse direction. Thus, main input drive gear 101 drives gears 125 and 106, and gear 125 will drive gear 104 also in the forward direction. Given this, the gear 104 could be thought of as a forward input gear and the gear 106 could be thought of a reverse input gear. The clutches 118 and 120 are one way clutches such that when driven in one direction transmit rotation between gears 104 and 108, or gear 106 and 110, and when driven in the opposed direction they slip. Thus, should gear 101 be driven in the direction shown in FIG. 2, gear 104 will transmit rotation to gear 108 which will in turn drive gear 103 to drive a shaft 300 which drives the oil pump 112 to supply oil to the gear reduction 48.

It should be noted, any gear in the A gear set can take input from the propeller shaft 105. Similarly, any gear in the B gear set can be connected to the oil pump to drive it in a constant direction. No matter the A gear that receives rotation the same relative rotations as describe will occur.

As can be appreciated from this figure, the forward input gear 104 has an outer peripheral envelope 126. The reverse input gear has an outer peripheral envelope 127. Gears 101 and 125 have outer peripheral envelopes 122 and 124, which are intermediate envelopes 127 and 128.

Figure 3:
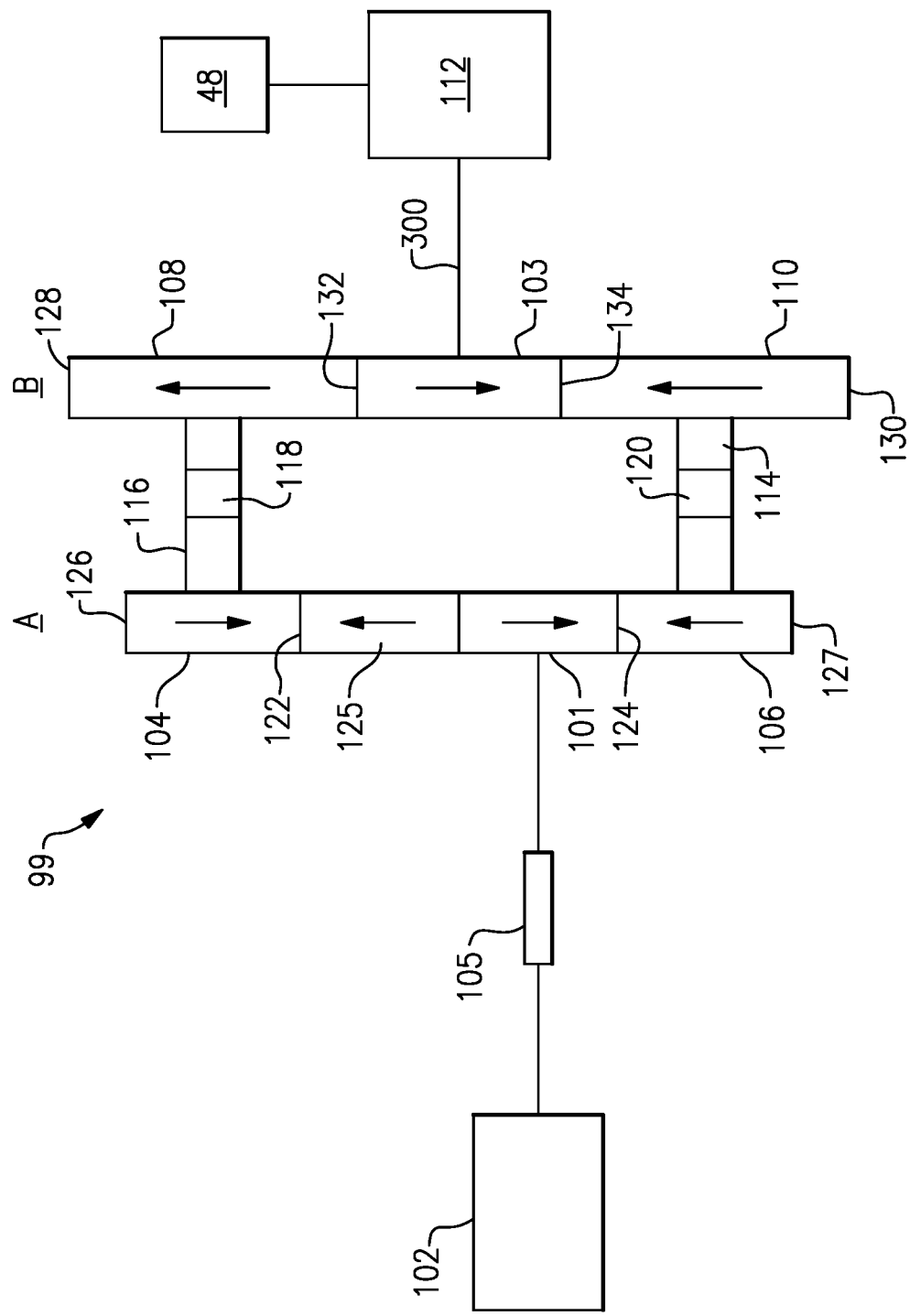
FIG. 3 shows rotation in a reverse direction of the gear connection.

FIG. 3 shows the gear train 99 when the main input drive gear 101 is driven in an opposed, or reverse direction. Now, gear 106 is being driven in the "forward" direction and gear 104 is being driven in the "reverse" direction. Clutch 118 will slip and clutch 120 will transmit rotation to gear 110 which will drive gear 103 in the same direction as shown in FIG. 2.

Figure 4:
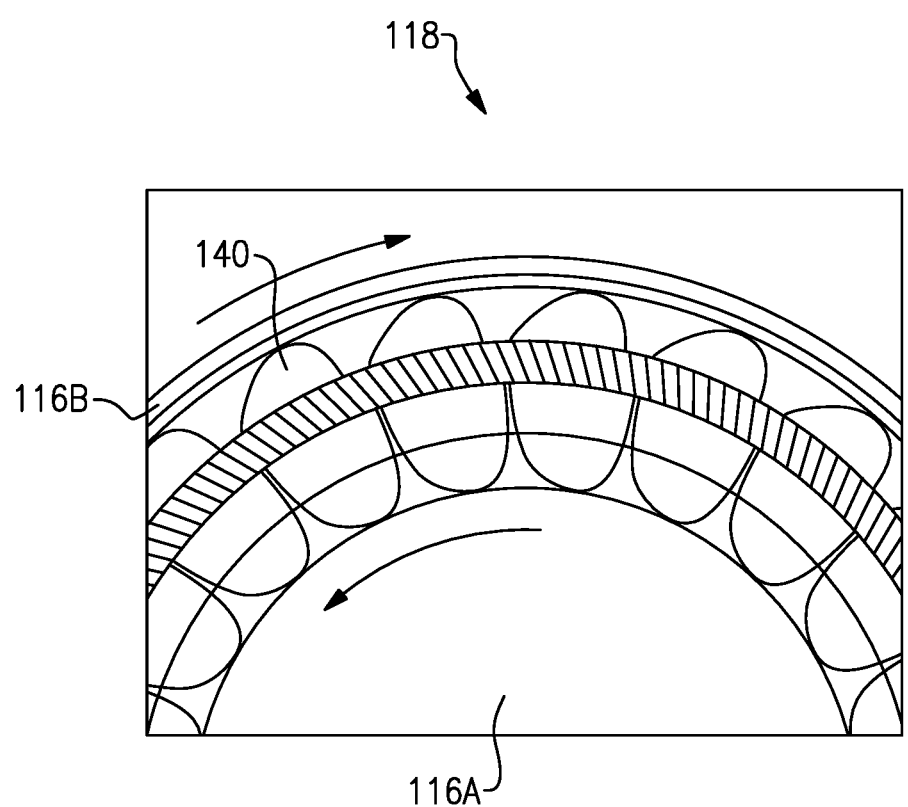
FIG. 4 shows a clutch detail.

As shown in FIG. 4, clutch 118 includes sprag clutch members 140 that transmit rotation between inner shaft 116A to outer shaft 116B when driven in the forward direction. However, when rotation occurs in the reverse direction, such rotation will not be transmitted by the sprag members 140. While a sprag clutch is shown, other examples such as ramp roller clutches and spring clutches may be used. Clutch 120 has the same features. Of course, the clutches could alternatively transmit rotation when driven in the reverse direction and slip when driven in the forward direction.

Figure 5:
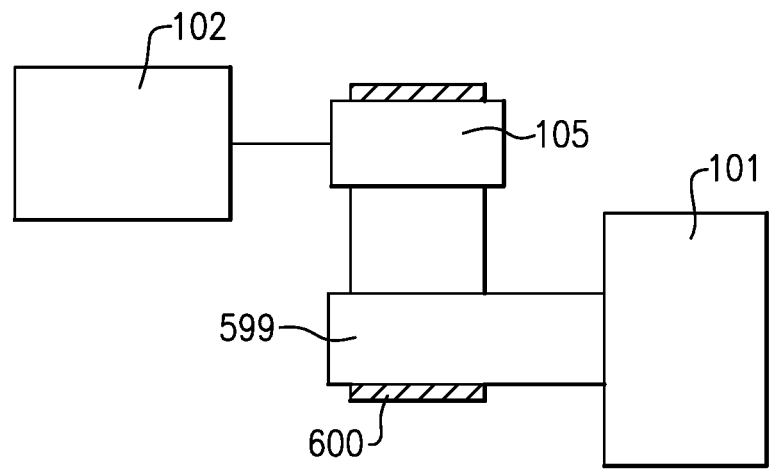
FIG. 5 shows another embodiment.

FIG. 5 shows the fan rotor 102 rotating shaft 105 which in turn drives the main input gear 101. The main input gear 101 may be driven by the shaft 105 though a chain or belt 600 which drives a shaft 599 connected to gear 101.

In other embodiments a hydraulic drive may be used.

Figure 6:
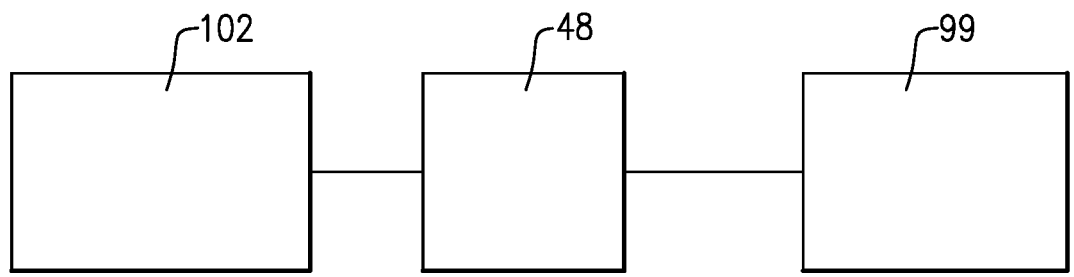
FIG. 6 shows another embodiment.

FIG. 6 shows the fan rotor 102 driven by the gear reduction 48 with the gear train 99 driven by the gear reduction 48 when wind milling occurs.

A gear system disclosed in U.S. Pat. No. 10,787,930 relates to a gear train with clutches transmit rotation in opposite direction from each other. The A gear set featured an odd number of gears and the B gear set included an even number of gears. This raises installation challenges as the clutches needed to be carefully assembled to make sure the proper distinct clutches are used.

During wind milling the fan rotor may rotate in either direction. Since clutches 118/120 are designed to transmit rotation in the same direction prevents installation errors of the driving direction compared to prior gear trains where the clutches transmit rotation in opposed directions.

Gear train 99 may be located within an engine bearing compartment or can be external to the core engine.

While the A gear set is disclosed as having four gears other even numbers of gears can be used. Similarly, odd numbers of gears other than three can be used for the B gear set. In an embodiments, the A gear set gears are all co-planar and the B gear set gears are also co-planar. However, they can also be offset in other embodiments.

A gas turbine engine under this disclosure could be said to include a propulsor rotor. A gear reduction drives a propulsor shaft that drives the propulsor rotor. A turbine drives the gear reduction. An oil system includes an oil pump driven by a gear train having a main input drive gear rotating when the propulsor rotor rotates. The gear train includes two sets of gears. The two sets of the gears are joined by two connection shafts. The two connection shafts each have a clutch, a first of the set of gears includes the main input drive gear. A second of the set of gears, having an output drive gear to drive the oil pump. The first set of the gears includes a forward input gear and a reverse input gear each driven by the main input gear. The forward input gear drives a forward pinion gear in the second set of gears through a first clutch and the reverse input gear drives a reverse pinion gear in the second set of gears through a second clutch. Each clutch transmits rotation driven in a same driving direction and slips in an alternate driving direction. The first set of the gears has an even number of the gears, and the second set of the gears has an odd number of the gears.

Although an embodiment of this invention has been disclosed, a worker or ordinary skill in this art would recognize that certain modifications would come within the scope of this disclosure. For that reason, the following claims should be studied to determine the true scope and content of this disclosure.

The invention claimed is:

1. A gas turbine engine comprising:
a propulsor rotor;
a gear reduction driving a propulsor shaft that drives said propulsor rotor;
a turbine driving said gear reduction;
an oil system including an oil pump driven by a gear train having a main input drive gear rotating when said propulsor rotor rotates;
the gear train including two sets of gears, said two sets of said gears joined by two connection shafts, said two connection shafts each having a clutch, a first of said set of gears including the main input drive gear, and a second of said set of gears, having an output drive gear to drive said oil pump;
the first set of said gears including a forward input gear and a reverse input gear each driven by said main input drive gear, said forward input gear driving a forward pinion gear in said second set of gears through a first said clutch and said reverse input gear driving a reverse pinion gear in said second set of gears through a second said clutch;
wherein each clutch transmits rotation driven in a same driving direction and slips in an alternate driving direction; and
wherein said first set of said gears has an even number of said gears, and said second set of said gears has an odd number of said gears.

2. The gas turbine engine as set forth in claim 1, wherein said main input drive gear is directly driven by the propulsor shaft and said forward and reverse pinion gears drive said oil pump though said output drive gear.

3. The gas turbine engine as set forth in claim 2, wherein said output drive gear is a gear other than said forward and reverse pinion gears.

4. The gas turbine engine as set forth in claim 3, wherein said main input drive gear is a gear other than said forward input gear and said reverse input gear.

5. The gas turbine engine as set forth in claim 2, wherein said main input drive gear is a gear other than said forward input gear and said reverse input gear.

6. The gas turbine engine as set forth in claim 2, wherein each said clutch is one of a sprag, ramp-roller and spring clutch.

7. The gas turbine engine as set forth in claim 1, wherein said main input drive gear is driven by one of a chain belt or hydraulic drive connected to said propulsor shaft.

8. The gas turbine engine as set forth in claim 7, wherein said output drive gear is a gear other than said forward and reverse pinion gears.

9. The gas turbine engine as set forth in claim 8, wherein said main input drive gear is a gear other than said forward input gear and said reverse input gear.

10. The gas turbine engine as set forth in claim 7, wherein said main input drive gear is a gear other than said forward input gear and said reverse input gear.

11. The gas turbine engine as set forth in claim 7, wherein each said clutch is one of a sprag, ramp-roller and spring clutch.

12. The gas turbine engine as set forth in claim 1, wherein said forward input gear and said reverse input gear each defining an outer envelope at an outer periphery, and there being an even number of gears having outer envelopes at an outer periphery intermediate said outer envelopes of said forward and reverse input gears.

13. The gas turbine engine as set forth in claim 12, wherein said main input drive gear is a gear other than said forward input gear and said reverse input gear.

14. The gas turbine engine as set forth in claim 1, wherein said output drive gear is a gear other than said forward and reverse pinion gears.

15. The gas turbine engine as set forth in claim 14, wherein said main input drive gear is a gear other than said forward input gear and said reverse input gear.

16. The gas turbine engine as set forth in claim 1, wherein said main input drive gear is a gear other than said forward input gear and said reverse input gear.

17. The gas turbine engine as set forth in claim 1, wherein each said clutch is one of a sprag, ramp-roller and spring clutch.

18. The gas turbine engine as set forth in claim 1, wherein said gears in said first set of gears are co-planar.

19. The gas turbine engine as set forth in claim 18, wherein said gears in said second set of gears are co-planar.

20. The gas turbine engine as set forth in claim 1, wherein said gears in said second set of gears are co-planar.

* * * * *